United States Patent
Parenti

(10) Patent No.: US 9,744,923 B2
(45) Date of Patent: Aug. 29, 2017

(54) SECURE ATTACHMENT

(71) Applicant: Steve Parenti, Newark, CA (US)

(72) Inventor: Steve Parenti, Newark, CA (US)

( * ) Notice: Subject to any disclaimer, the term of this patent is extended or adjusted under 35 U.S.C. 154(b) by 174 days.

(21) Appl. No.: 14/814,298

(22) Filed: Jul. 30, 2015

(65) Prior Publication Data

US 2015/0336520 A1    Nov. 26, 2015

Related U.S. Application Data

(63) Continuation-in-part of application No. 14/273,968, filed on May 9, 2014, now Pat. No. 9,283,904.

(51) Int. Cl.
*F16B 37/14*    (2006.01)
*F16B 41/00*    (2006.01)
*B60R 13/10*    (2006.01)

(52) U.S. Cl.
CPC .......... *B60R 13/105* (2013.01); *F16B 41/005* (2013.01); *F16B 37/14* (2013.01)

(58) Field of Classification Search
CPC .............................. F16B 37/14; F16B 41/005
USPC ........... 411/372.5, 372.6, 373, 374, 429, 910
See application file for complete search history.

(56) References Cited

U.S. PATENT DOCUMENTS

| | | | | |
|---|---|---|---|---|
| 3,333,439 A | * | 8/1967 | Bessette | F16C 1/06 285/80 |
| 4,540,322 A | * | 9/1985 | Coffia | F16B 41/005 411/338 |
| 4,645,422 A | * | 2/1987 | Brushaber | B63H 23/34 411/910 |
| 4,790,159 A | * | 12/1988 | Quinn | E05D 5/128 70/232 |
| 5,135,358 A | * | 8/1992 | Myers | B63H 1/20 416/244 B |
| 5,630,687 A | * | 5/1997 | Robinson | F16B 41/005 411/372.6 |
| 6,102,064 A | * | 8/2000 | Robinson | B60C 29/06 137/232 |

\* cited by examiner

*Primary Examiner* — Flemming Saether
(74) *Attorney, Agent, or Firm* — Douglas L. Weller

(57) ABSTRACT

A license plate attachment device includes a cap that covers a nut or a screw used to attach a license plate to an automobile or frame attached to the automobile frame. An anchor bearing anchors the license plate to the automobile or frame so that an outer periphery of the anchor bearing rotates freely while the anchor bearing is held tightly in place on the automobile or frame. The anchor bearing has a slot located at the outer periphery. The cap is secured to the anchor bearing using a first headless socket screw and a second headless socket screw. A socket size of the first headless socket screw is different than a socket size of the second headless socket screw.

9 Claims, 6 Drawing Sheets

SECURE ATTACHMENT

BACKGROUND

Tamper proof "security screws" and nuts have been used to prevent or frustrate vandals and petty thieves. These are used, for example to secure wheel rims to automobiles or protect against unauthorized removal of license plates. Some security screws rely upon a screw head having an unusual shape that requires a special tool to be used. Other security screws may have an asymmetric one-way, clutch head design that allows for easy attachment but not for removal. Alternatively, a threaded cap requiring a special tool to remove the cap may be used to hinder access to a traditional screw, as shown for example in D621,254S.

DESCRIPTION OF THE EMBODIMENT

A license plate attachment device includes a cap that covers a nut or a screw used to attach a license plate to an automobile or to a frame attached to an automobile. An anchor bearing anchors the license plate to the automobile or frame so that an outer periphery of the anchor bearing rotates freely while the anchor bearing is held tightly in place on the automobile or frame. The anchor bearing has a slot located at the outer periphery. The cap is secured to the anchor bearing using a first headless socket screw and a second headless socket screw. A socket size of the first headless socket screw is different than a socket size of the second headless socket screw.

For example the first headless socket screw is a hex socket headless screw and the second headless socket screw is a hex socket headless screw.

In one implementation, the first headless socket screw is placed in a first treaded hole in the cap to allow securing the cap to the anchor bearing. The second headless socket screw is placed in a second treaded hole in a ring to allow securing the ring to the cap. For example, the cap includes external screw threads and the ring has internal screw threads that match the external screw threads of the cap so that so that ring can be screwed onto the cap.

In another implementation, the first headless socket screw is placed in a first treaded hole in the cap to allow securing the cap to the anchor bearing and the second headless socket screw is also placed in a second treaded hole in the cap to allow securing the cap to the anchor bearing.

For example, when a frame attached to the automobile is used, the frame has a first hole and a second hole spaced and configured to match locations for attaching a license plate on an automobile. The frame also includes a plurality of screws configured to match locations for attachment holes of the license plate.

Figure 1:
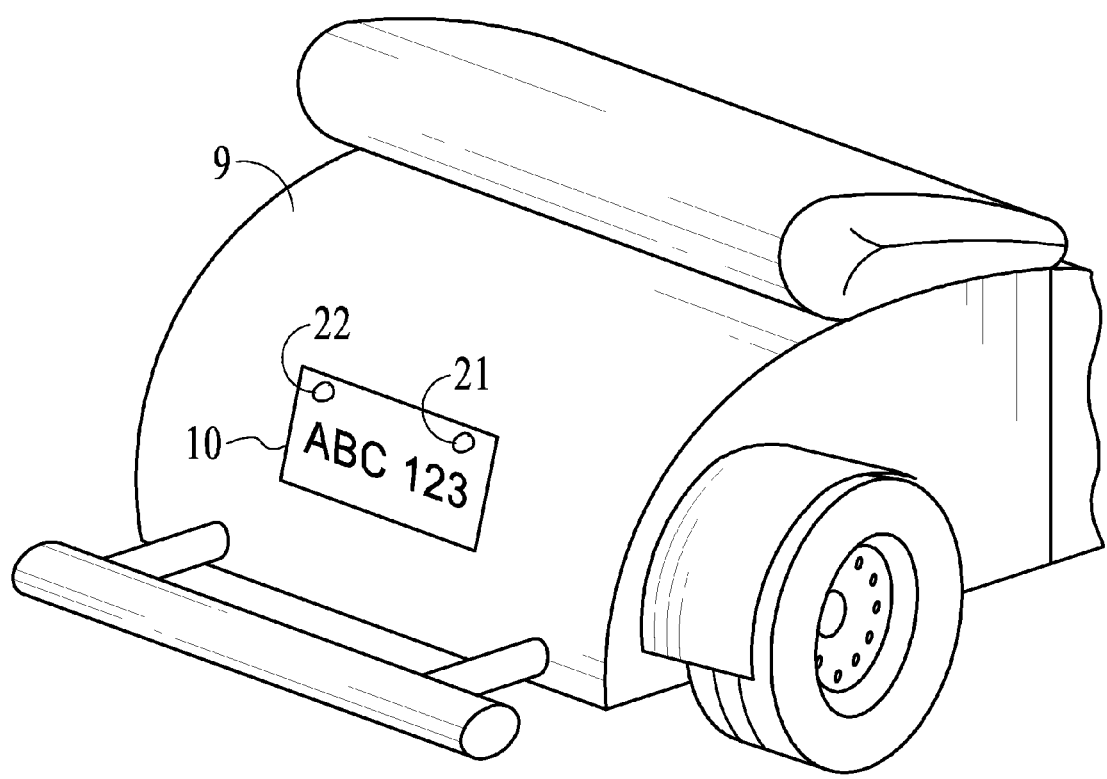
FIG. 1 shows a license plate securely attached to an automobile in accordance with an implementation.

FIG. 1 shows a license plate 10 securely attached to an automobile 9 using screws covered by a security cover 21 and a security cover 22.

Figure 2:
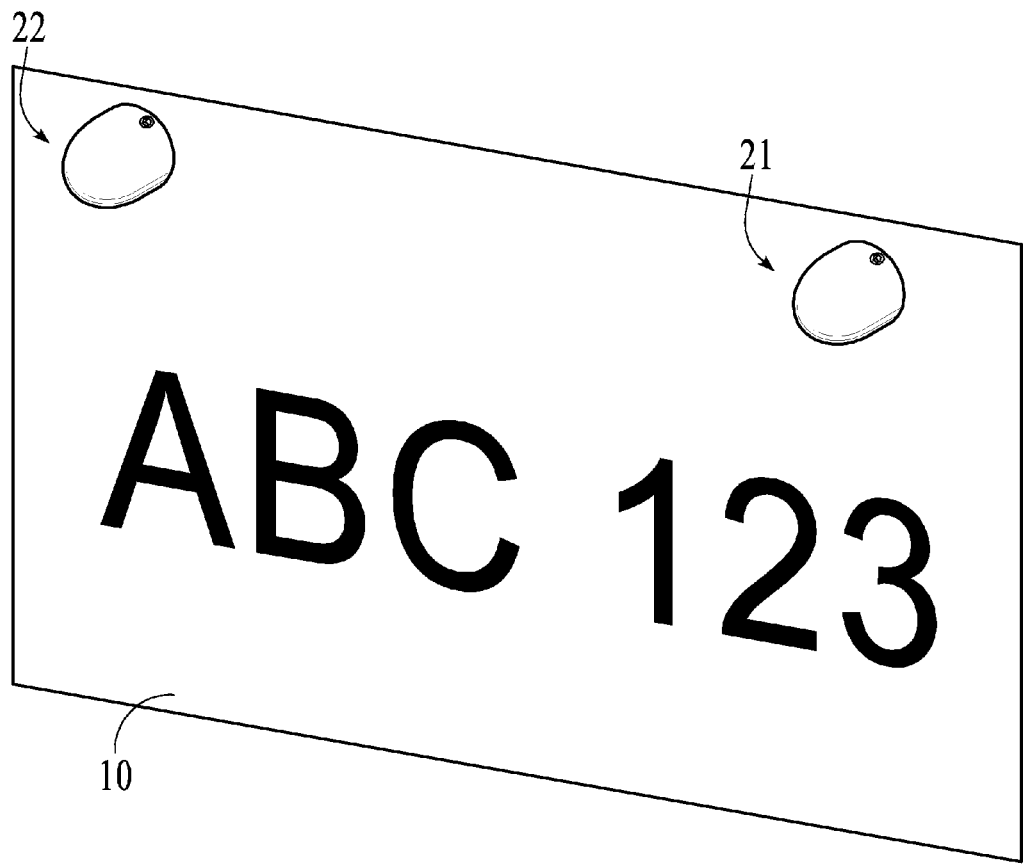
FIG. 2 shows security covers being used to securely attach a license plate to an automobile in accordance with an implementation.

FIG. 2 shows additional details of security cover 21 as assembled. Particularly, a cap 12 spins freely when security cover 21 is attached to automobile 9.

Figure 3:
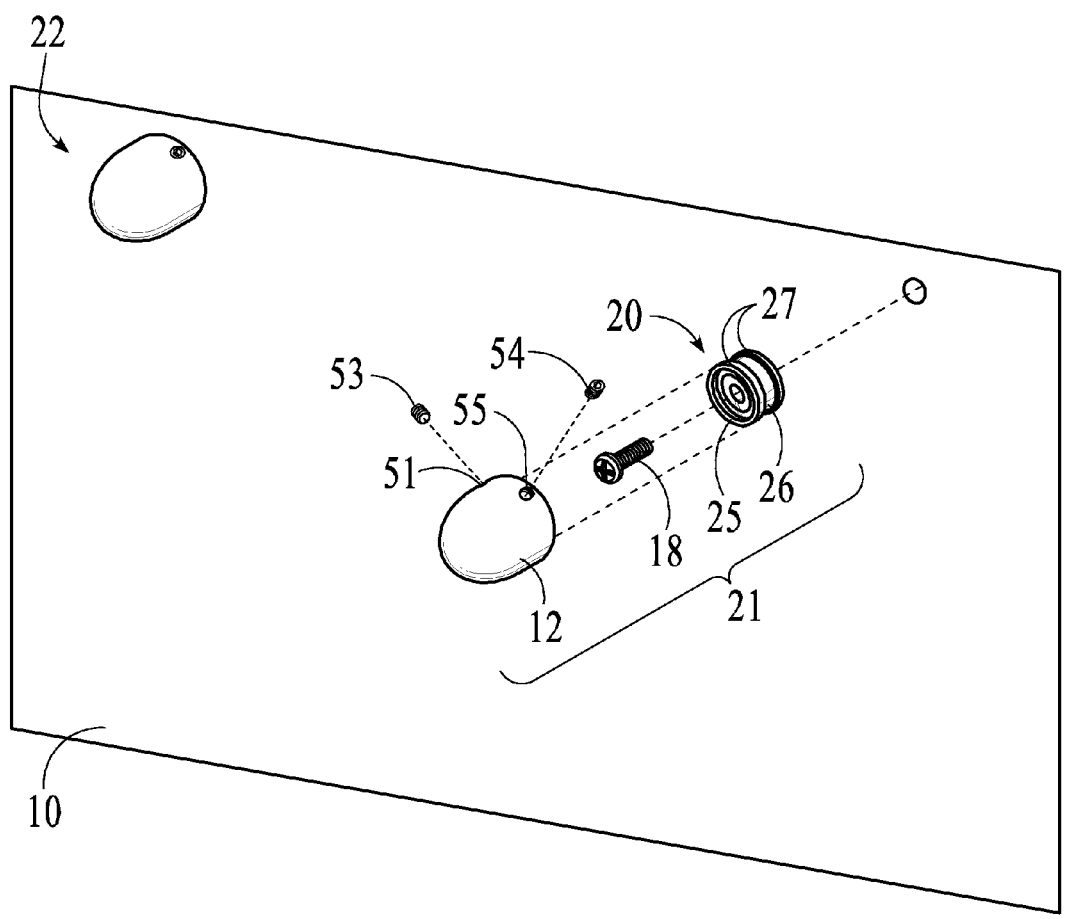
FIG. 3 show a disassembled security cover in accordance with an implementation.

FIG. 3 shows security cover 21 in a disassembled state. To assemble, a screw 18 is placed through an anchor bearing 20. Herein, screw is used generically to refer to screws, bolts or any other attachment device that uses helical threads for secure attachment. For example, screw 18 is a standard screw that may have a head shaped to receive a Phillips screwdriver or a flat head screwdriver. Alternatively, screw 18 may have another standard or non-standard shaped screw head. Screw 18 is placed through anchor bearing 20 and screwed into a threaded hole 16 in automobile 10. When tightened, screw 18 holds anchor bearing 20 tightly against license plate 10. When screw 18 is tightened, an outside perimeter 25 of anchor bearing 20 can be freely rotated.

A cap 12 covers the head of screw 18 and anchor bearing 20. At least two headless socket screws of different sizes are used to attach cap 12 to anchor bearing 20. A headless socket screw 53 is placed in a screw hole 51 and tightened until headless socket screw 53 locks into a slot 26 located between ridges 27 of outside perimeter 25 of anchor bearing 20. A headless socket screw 55 is placed in a screw hole 54 and tightened until headless socket screw 55 locks into slot 26 located between ridges 27 of outside perimeter 25 of anchor bearing 20. For example headless socket screw 53 and headless socket screw 55 are each hex socket headless screws of different sizes. For example, headless socket screw 53 fits a 1/16 inch hex wrench while headless socket screw 53 fits a 5/64 inch hex wrench. Other sizes and other types of socket screws can be used. For example a square or Robinson headless socket screw can be used, etc.

Figure 4:
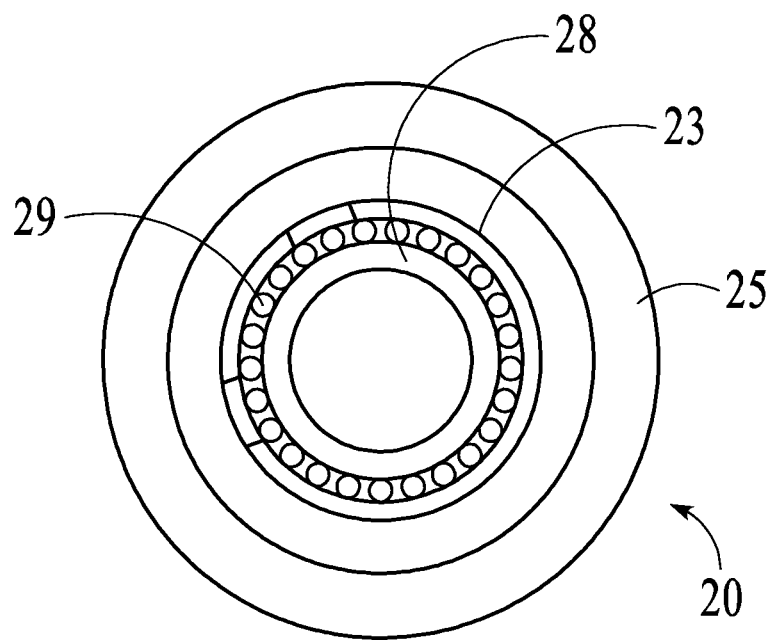
FIG. 4 shows a bearing.

FIG. 4 shows details of anchor bearing 20. An inner ring 28 is raised slightly so that screw 18 tightens against inner ring 18. Bearings 29 inside a bearing region 23 allows outside perimeter 25 to rotate freely around inner ring 28 so that even when inner ring 28 is held firmly against license plate 10 by screw 18, outside perimeter 25 can still rotate freely.

Figure 5:
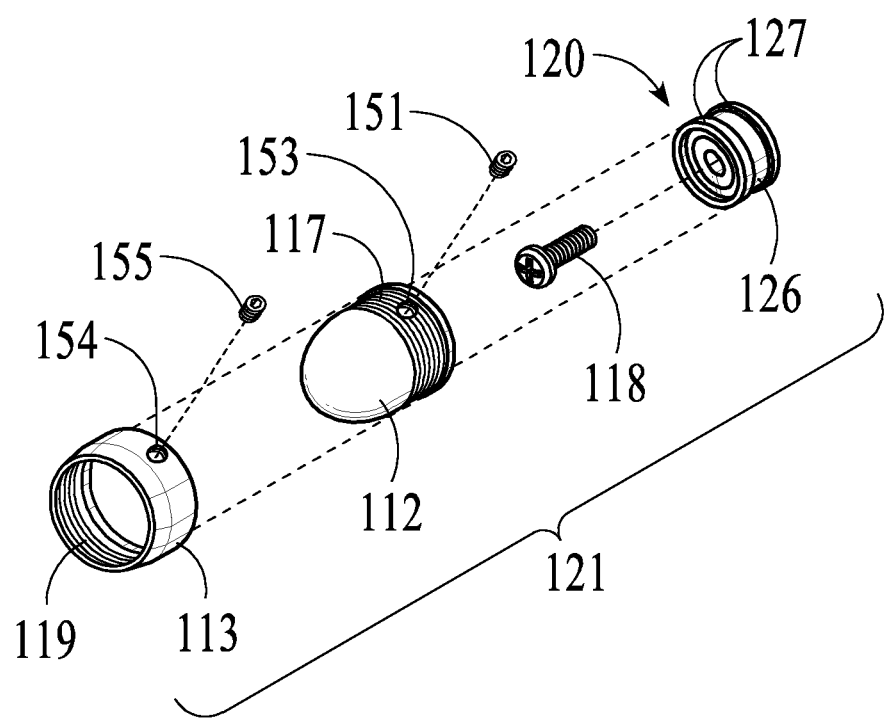
FIG. 5 shows a disassembled security cover in accordance with another implementation.

FIG. 5 shows an alternative security cover 121 in a disassembled state. To assemble, a screw 118 is placed through an anchor bearing 120. For example, screw 118 is a standard screw that may have a head shaped to receive a Phillips screwdriver or a flat head screwdriver. Alternatively, screw 118 may have another standard or non-standard shaped screw head. Screw 118 is placed through anchor bearing 120 and screwed into a threaded hole of an automobile. When tightened, screw 118 holds anchor bearing 120 tightly against the license plate. When screw 118 is tightened, an outside perimeter 125 of anchor bearing 120 can be freely rotated.

A cap 112 covers the head of screw 118 and anchor bearing 120. At least one headless socket screw is used to attach cap 112 to anchor bearing 120. A headless socket screw 153 is placed in a screw hole 151 and tightened until it locks into a slot 126 located between ridges 127 of outside perimeter 125 of anchor bearing 120.

A ring 113 is placed over cap 112. Threads 119 of ring 113 engage with threads 117 of cap 112 allowing ring 113 to be screwed tight onto cap 112. A headless socket screw 155 is placed in a screw hole 154 and tightened until it locks ring 113 to cap 112. For example, headless socket screw 153 and headless socket screw 155 are each hex socket headless screws of different sizes. For example, headless socket screw 153 fits a 1/16 inch hex wrench while headless socket screw 153 fits a 5/64 inch hex wrench. Other sizes and other types of socket screws can be used. For example a square or Robinson headless socket screw can be used, etc.

In alternative implementations, a frame with embedded screws may be placed between license plate 10 and automobile 9 so that license plate 10 is attached to automobile 9 using nuts. Also, additional headless socket screws may be used.

Figure 6:
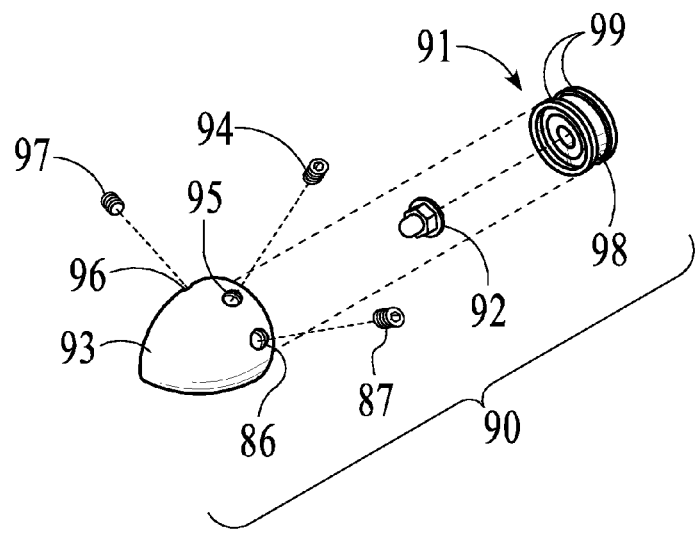
FIG. 6 shows a disassembled security cover in accordance with an implementation.

FIG. 6 shows a security cover 90 in a disassembled state. Security cover 93 has a "bullet head" shape. To assemble, a nut 92 is screwed onto a screw placed through an anchor bearing 91. When tightened, nut 92 holds anchor bearing 91 tightly against license plate 10.

Cap 93 covers the head of nut 92 and anchor bearing 91. At least two headless socket screws of different sizes are used to attach cap 93 to anchor bearing 91. A headless socket screw 94 is placed in a screw hole 95 and tightened until it locks into a slot 98 located between ridges 99 of outside perimeter 25 of anchor bearing 91. A headless socket screw 97 is placed in a screw hole 96 and tightened until it locks into slot 98 located between ridges 99 of outside perimeter 25 of anchor bearing 91. A headless socket screw 87 is placed in a screw hole 86 and tightened until it locks into slot 98 located between ridges 99 of outside perimeter 25 of anchor bearing 91. For example headless socket screw 94, headless socket screw 97 and headless socket screw 97 are each hex socket headless screws of different sizes.

Figure 7:
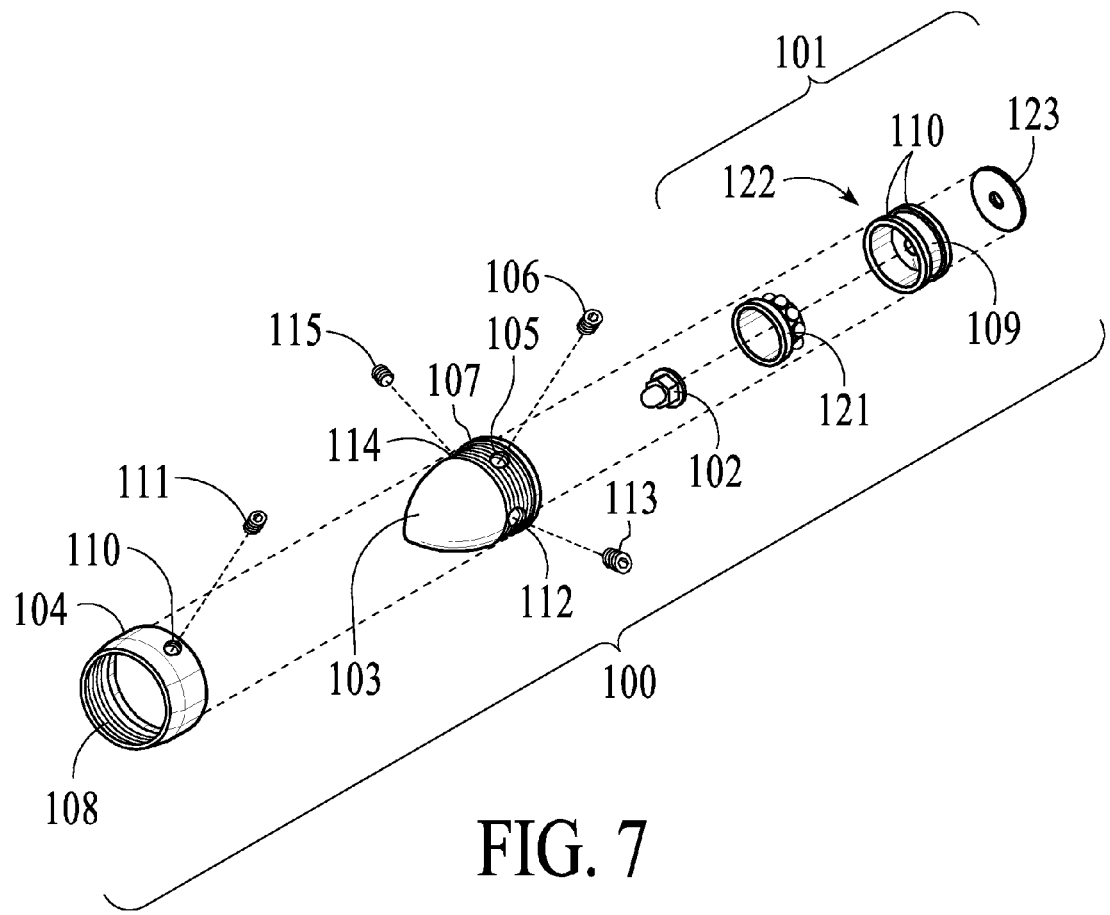
FIG. 7 shows a disassembled security cover in accordance with another implementation.

FIG. 7 shows an alternative security cover 100 in a disassembled state. To assemble, a nut 102 is screwed onto a screw extending through an anchor bearing 101. When tightened, nut 102 holds anchor bearing 101 tightly against the license plate. When nut 102 is tightened, an outside perimeter of anchor bearing 101 can be freely rotated.

Cap 103 covers the head of nut 102 and anchor bearing 101. At least one headless socket screw is used to attach cap 103 to anchor bearing 101. For example, a headless socket screw 106 is placed in a screw hole 105 and tightened until it locks into a slot 109 located between ridges 110 of the outside perimeter of anchor bearing 101. A headless socket screw 115 is placed in a screw hole 14 and tightened until it locks into a slot 109 located between ridges 110 of the outside perimeter of anchor bearing 101. A headless socket screw 113 is placed in a screw hole 112 and tightened until it locks into a slot 109 located between ridges 110 of the outside perimeter of anchor bearing 101. While FIG. 7 shows three headless socket screws used to secure cap 103 to anchor bearing 101, more or fewer headless socket screws can be used.

A ring 104 is placed over cap 103. Threads 108 of ring 104 engage with threads 107 of cap 103 allowing ring 104 to be screwed tight onto cap 103. A headless socket screw 111 is placed in a screw hole 110 and tightened until it locks ring 104 to cap 103. While FIG. 7 shows one headless socket screw used to secure cap 103 to anchor bearing 101, more headless socket screws can be used For example headless socket screw 106, headless socket screw 113, headless socket screw 115 and headless socket screw 111 are each hex socket headless screws of different sizes. This means four different size hex wrenches are necessary to access nut 102.

FIG. 7 also shows details of anchor bearing 101. Anchor bearing 101 is shown to be composed of a bearing 121, a wheel part 122 and a washer 123. Bearing 121 is pressed inside wheel part 122. The set screw for the license plate will add additional security to hold together bearing 121.

The caps disclosed herein can be used to cover screw heads, bolt heads and nuts of all sorts. For example, the caps can be used to cover acorn nuts for automobiles made by Volvo Corporation.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A license plate attachment device comprising:
a cap that covers a screw or a nut used to attach a license plate to an automobile, the cap including external screw threads;
an anchor bearing that when held tightly in place on the automobile by the screw or nut, anchors the license plate to the automobile so that an outer periphery of the anchor bearing rotates freely while the anchor bearing is held tightly in place on the automobile, the anchor bearing having a slot located at the outer periphery; and,
a ring sized to fit over the cap, the ring having internal screw threads that match the external screw threads of the cap so that so that the ring can be screwed onto the cap;
wherein the cap has a first treaded hole into which a first headless socket screw is placed to allow securing the cap to the anchor bearing;
wherein the ring has a second treaded hole into which a second headless socket screw is placed to allow securing the ring to the cap; and,
wherein a socket size of the first headless socket screw is different than a socket size of the second headless socket screw.

2. A license plate attachment device as in claim 1 wherein the first headless socket screw is a hex socket headless screw and the second headless socket screw is a hex socket headless screw.

3. A license plate attachment device comprising:
a cap that covers a screw or a nut used to attach a license plate to an automobile;
an anchor bearing that when held tightly in place on the automobile by the screw or nut, anchors the license plate to the automobile so that an outer periphery of the anchor bearing rotates freely while the anchor bearing is held tightly in place on the automobile, the anchor bearing having a slot located at the outer periphery; and,
wherein the cap has a first treaded hole into which a first headless socket screw is placed to allow securing the cap to the anchor bearing;
wherein the cap has a second treaded hole into which a second headless socket screw is placed to allow securing the ring to the cap; and,
wherein a socket size of the first headless socket screw is different than a socket size of the second headless socket screw.

4. A license plate attachment device as in claim 3 wherein the first headless socket screw is a hex socket headless screw and the second headless socket screw is a hex socket headless screw.

5. A license plate attachment device comprising:
a frame having a first hole and a second hole spaced configured to match locations for placing a license plate on an automobile, the frame including a plurality of screws configured to match locations for attachment holes of the license plate; and,
at least one license plate attachment device, wherein the at least one license plate attachment device includes:
  a cap that covers a nut that is used to screw onto one of the plurality of screws in order to attach the license plate to the frame, and
  an anchor bearing that when held tightly in place on the frame by the nut, anchors the license plate to the frame so that an outer periphery of the anchor bearing rotates freely while the anchor bearing is held tightly in place on the frame, the anchor bearing having a slot located at the outer periphery;
wherein the cap is secured to the anchor bearing using a first headless socket screw and a second headless socket screw; and,
wherein a socket size of the first headless socket screw is different than a socket size of the second headless socket screw.

6. A license plate attachment device as in claim 5 wherein the first headless socket screw is a hex socket headless screw and the second headless socket screw is a hex socket headless screw.

7. A license plate attachment device as in claim 5:
wherein the first headless socket screw is placed in a first treaded hole in the cap to allow securing the cap to the anchor bearing; and,
wherein the second headless socket screw is placed in a second treaded hole in the cap to allow securing the cap to the anchor bearing.

8. A license plate attachment device comprising:
a frame having a first hole and a second hole spaced configured to match locations for placing a license plate on an automobile, the frame including a plurality of screws configured to match locations for attachment holes of the license plate; and,
at least one license plate attachment device, wherein the at least one license plate attachment device includes:
  a cap that covers a nut that is used to screw onto one of the plurality of screws in order to attach the license plate to the frame, and
  an anchor bearing that when held tightly in place on the frame by the nut, anchors the license plate to the frame so that an outer periphery of the anchor bearing rotates freely while the anchor bearing is held tightly in place on the frame, the anchor bearing having a slot located at the outer periphery;
wherein a first headless socket screw is placed in a first treaded hole in the cap to allow securing the cap to the anchor bearing;
wherein a second headless socket screw is placed in a second treaded hole in a ring to allow securing the ring to the cap; and,
wherein a socket size of the first headless socket screw is different than a socket size of the second headless socket screw.

9. A license plate as in claim 8:
wherein the cap includes external screw threads; and,
wherein the ring has internal screw threads that match the external screw threads of the cap so that so that ring can be screwed onto the cap.

* * * * *